United States Patent [19]

Li et al.

[11] 4,091,002

[45] May 23, 1978

[54] VULCANIZABLE ELASTOMER FROM THIODIETHANOL AND AN OLIGOMERIC POLYESTER

[75] Inventors: Tsi Tieh Li, Milltown; Robert Saxon, Princeton, both of N.J.

[73] Assignee: American Cyanamid Company, Stamford, Conn.

[21] Appl. No.: 731,976

[22] Filed: Oct. 14, 1976

[51] Int. Cl.² .................. C08G 63/54; C08G 63/68
[52] U.S. Cl. .................. 260/75 S; 260/40 R; 260/75 UA
[58] Field of Search .................. 260/75 S, 75 UA

[56] References Cited

U.S. PATENT DOCUMENTS

| | | | |
|---|---|---|---|
| 2,988,532 | 6/1961 | Nischk et al. | 260/75 S |
| 4,028,305 | 6/1977 | Li et al. | 260/75 S |

FOREIGN PATENT DOCUMENTS 541,893  10/1955  Belgium.

*Primary Examiner*—Melvyn I. Marquis
*Attorney, Agent, or Firm*—Frank M. Van Riet

[57] ABSTRACT

Vulcanizable elastomeric compositions derived from thiodiethanol and more particularly, vulcanizable elastomeric compositions comprising the reaction product of a major proportion of thiodiethanol and a minor proportion of a low molecular weight, hydroxyl terminated aromatic or cycloaliphatic polyester.

5 Claims, No Drawings

VULCANIZABLE ELASTOMER FROM THIODIETHANOL AND AN OLIGOMERIC POLYESTER

This invention relates to vulcanizable elastomeric compositions derived from thiodiethanol. More particularly, it relates to vulcanizable elastomeric compositions comprising the reaction product of a major proportion of thiodiethanol and a minor proportion of a low molecular weight, hydroxyl terminated aromatic or cycloaliphatic polyester.

Thiodiethanol is known to undergo autocondienstion in the presence of certain acidic catalysts, for example phosphorous acid, to provide polythiodiethanol. Thiodiethanol is unique in this respect among aliphatic diols because of the unusual reactivity of a hydroxyl group situated in a position beta to a sulfur atom in an aliphatic chain:

$$(n + 1)\, S(C_2H_4OH)_2 \xrightarrow{H^+}$$
$$HO\text{-}[C_2H_4SC_2H_4O]_n\text{-}C_2H_4SC_2H_4OH + nH_2O \qquad (I)$$

Heretofore, liquid low molecular weight, hydroxyterminated thiodiethanol polymers were disclosed as polyols as intermediates for polyurethane prepolymers; see, for example, Holtschmidt et al, U.S. Pat. No. 2,998,413; French Pat. No. 1,373,471; German Pat. No. 1,045,641. See also U.S. Pat. No. 2,862,962; German Pat. Nos. 1,007,502; 1,045,641 and 1,108,903 and British Pat. Nos. 791,854 and 818,359.

Aloia, in U.S. Pat. No. 3,951,927, describes millable, vulcanizable elastomers based on the condensation reaction of a major proportion of thiodiethanol with other aliphatic diols, including at least one which contains an external allylic double bond.

Chang and Saxon, in another copending commonly assigned application, Ser. No. 507,025, filed September 18, 1974, now U.S. Pat. No. 3,985,708 describe vulcanizable elastomer compositions comprising a major proportion of thiodiethanol, one or more aliphatic diols, including at least one which contains an external allylic double bond, and a minor amount of a diphenolic compound.

Li and Saxon, in commonly assigned application, Ser. No. 534,545, filed Dec. 19, 1974, now abandoned, describe vulcanizable elastomer compositions comprising a major proportion of thiodiethanol, one or more aliphatic diols, including at least one which contains an external allylic double bond, and a minor proportion of terephthalic acid.

The foregoing applications are believed to represent the first disclosures of vulcanizable elastomers derived from thiodiethanol. The resulting elastomers are characterized by excellent low temperature properties and outstanding resistance to hydrocarbon oils.

Although the various procedures described permit the preparation of high molecular weight elastomeric gums, that is, having Mooney viscosities sufficiently high to permit satisfactory milling and compounding according to conventional rubber compounding techniques, none of them differ substantially in their stress-strain properties when vulcanized.

The present invention is based on the discovery of thiodiethanol based vulcanizable elastomers, which exhibit excellent stress-strain properties in addition to excellent low temperature properties and outstanding oil resistance, comprising the products of condensation of thiodiethanol and a low molecular weight, oligomeric aromatic or cycloaliphatic polyester.

In accordance with the invention thiodiethanol, in major proportion, i.e. at least about 50 mole percent, is condensed with a preformed low molecular weight, hydroxyl terminated aromatic or cycloaliphatic polyester to provide tough elastomeric gums which, when vulcanized by conventional techniques, have excellent stress-strain properties. The elastomers consist essentially of a multiplicity of recurring long chain and short chain polymeric units connected in a head-to-tail manner through ether linkages.

The long chain units are those derived from the condensation of a major proportion of thiodiethanol with one or more aliphatic diols, and comprise repeating units (II) and (III):

wherein R represents the radical, or radicals, remaining on removal of two hydroxyl groups from one or more aliphatic diols. At least one of such diols must contain external unsaturation, as defined below.

The short chain units have the structure (IV):

and are incorporated by the polyetherification reaction of the long chain polymer units with the oligomeric polyester (V):

wherein G is a divalent, open-chain alkylene residue having 3 to 8 carbon atoms, X is a hydrocarbon residue of an aromatic or cycloaliphatic dicarboxylic acid and is selected from m-phenylene, p-phenylene, m-hexahydrophenylene and p-hexahydrophenylene, and y is an integer from about 1.5 to 6, and may be fractional, representing an average value for a mixture.

In the preferred embodiments of the invention, G is 1,4-butylene, X is 1,4-phenylene and y is about 2. It will be understood that mixtures of species in accordance with the above definitions may also be used without departing from the scope of the invention.

The elastomers resulting from the present invention comprise from about 5 to about 20 weight percent of structural units (IV). When the elastomers contain less than about 5 weight percent of said structural units they exhibit relatively poorer tensile properties. When the elastomers contain more than about 20 weight percent of said structural units the composition becomes a hard, plastic-like material. Since the oligomeric units (IV) are of high molecular weight relative to thiodiethanol, the range of 5 to 20 weight percent (IV) corresponds to a lower mole percentage, i.e. from about 0.5 to about 8 mole percent.

The oligomeric polyester (V) is prepared, for example, by the condensation of 3 molar proportions of 1,4-butanediol with 2 molar proportions of terephthalic acid, eliminating 4 molar proportions of water, or via a transesterification reaction using dimethyl terephthalate with the elimination of methanol. The resulting oligomer has a molecular weight of 530 and a melting point of about 170°–175°. If the oligomer is made from 2 molar proportions of 1,4-butanediol and 1 molar proportion of terephthalic acid, it has a melting point of about 120°–135° C and is not suitable for use according to the invention since no improvement in stress-strain properties or gum strength is observed over a control composition containing none of the oligomer. Oligomers made from ethylene glycol instead of 1,4-butanediol have a melting point greater than about 200° C, whereas those from 1,4-cyclohexanedimethanol melt higher than about 250° C. Thus, ethylene glycol and 1,4-cyclohexanedimethanol are not suitable diols, since synthesis as well as processing of the elastomeric product are rendered difficult by the high melting point of the oligomeric segment. It is observed, therefore, that oligomers which have melting points higher than about 200° C tend to be less soluble and slower to react with thiodiethanol and are not ordinarily practical for use in accordance with the invention. Purely aliphatic diols with more than 8 carbon atoms give oligomers which are, in general, lower melting than those from diols containing 3 to 8 carbon atoms and are therefore less useful. Random copolymers result when thiodiethanol, 1,4-butanediol, dimethyl terephthalate and an unsaturated aliphatic diol are reacted. When the mole ratio of the aliphatic diol to the aromatic or cycloaliphatic dicarboxylic acid is the same as used in the preformed oligomers of the invention, no improvement in stress-strain properties of the resulting elastomeric compositions is observed.

Thus, the ordered structure of the oligomers of the invention is critical. In fact, it is surprising that the elastomers produced by the invention have improved stress-strain properties, since the ordered structure introduced by (V) is not randomized by the reaction with thiodiethanol and other aliphatic diols, as would have been expected.

Thiodiethanol, in an amount in excess of about 50 mole percent of the total reactants, is copolymerized, using an acidic catalyst, such as phosphorous acid, with one or more aliphatic diols, at least about 1 to about 10 mole percent of the total reactants being an aliphatic diol which contains a reactive double bond, and from about 0.5 to about 8 mole percent of the oligomeric polyester (V).

Aliphatic diols which may be copolymerized with thiodiethanol in accordance with the invention include saturated linear, branched chain or cyclic diols, and unsaturated diols in which the unsaturation is external. Suitable diols include ethylene glycol, propane-1,2-diol, propane-1,3-diol, butane-1,4-diol, pentane-1,5-diol, hexane-1,6-diol, diethylene glycol; cyclohexane di(lower alkylene) diols, such as cyclohexane-1,2-and 1,4-dimethanol, either cis or trans or mixtures thereof, cyclobutane di(lower alkylene) diols, such as cyclobutane-1,3-dimethanol; aralkylene diols, such as bis(hydroxyethyl) ether of hydroquinone or resorcinol; monoallyl ether of trimethylolpropane; glycerol monoallyl ether, 3-cyclohexene-1,1-dimethanol; bicyclic aliphatic diols, such as 5-norbornene-2,2-dimethanol, 5-norbornene-2,3-dimethanol, and the like. Preferred saturated diols include diethylene glycol, butane-1,4-diol, bis(hydroxy ethoxy) hydroquinone. Preferred unsaturated diols include monoallyl ether of trimethylolpropane, glycerol monoallyl ether and 3-cyclohexene-1,1-dimethanol. It should be noted that the variety of diols which may be randomly copolymerized with thiodiethanol in accordance with the invention is very wide in contrast with the more limited range of diols useful in preparing the oligomeric polyester component described above.

The expression "external unsaturation", as used hereinabove, refers to the position of the unsaturation in the diol molecule such that at least one continuous chain of atoms in the diol, extending between the two diol oxygen atoms, does not include a carbon-to-carbon double bond. Thus, when the diol containing the unsaturation is incorporated into the polymer, the backbone of the polymer is saturated and the double bond is pendant, or may be on an alternate path along the backbone. The unsaturation is characterized herein as an allylic double bond; that is, the carbon atom adjacent the double bond contains an allylic hydrogen atom. Such double bonds are represented as follows:

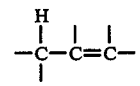

The polymers are prepared under dehydrating conditions using an acidic catalyst. Acids having a pK of 5 or less are useful. Certain acid catalysts, although useful, tend to produce undesirable side reactions leading to the formation of odoriferous thioxane or dithiane and are, therefore, less desirably used. Suitable catalysts include hydrogen chloride and sulfuric acid, p-toluenesulfonic acid, sulfamic acid, picric acid, phosphorous acid, trialkyl phosphites, and the like. Phosphorous acid is a preferred acid catalyst. Effective catalysis is achieved using from about 0.01 to 3 percent by weight of monomers, preferably 0.1 to 1 percent. More than about 3 percent may be used, but no advantage results therefrom.

The mill handling characteristics of the elastomers are evaluated by the so-called Mooney Value (ML-4). The Mooney value of natural rubber, e.g., is high, due to naturally occurring cross-links. Natural rubber, with a Mooney value of about 60, must be broken down on a rubber mill before conventional rubber compounding ingredients can be incorporated. Most useful synthetic elastomers have Mooney values in the range of about 20–50; elastomers with Mooney values of 5–10 can be handled on a rubber mill, but with difficulty. The elastomers of the present invention, in its preferred embodiments, have Mooney values in the range of about 10 to 50, preferably above about 20, as measured according to ASTM No. D1646. The Mooney value of the polymers of the invention may be increased by the incorporation of small amounts of cross-linking, without departing from the scope thereof. Such cross-linking is optional, and may be achieved by incorporating minor amounts of an aliphatic triol in the polymer, for example, trimethylolpropane.

The polymers have excellent low temperature flexibility, as measured by thermomechanical analysis using a duPont Thermomechanical Analyzer, Model 990, Module 942. The method basically measures the first transition temperature of a specimen which is warmed from −120° C in contact with a weighted, needle-like probe. The transition temperature is determined from the first deflection point on a continuously recording chart. This first transition temperature is analogous to the glass transition temperature (Tg) and is referred to herein as brittle point.

Similarly, the polymers have outstanding resistance to hydrocarbon oils, as evidenced by extremely low volume swell in contact with said oils. This is measured in accordance with ASTM No. D471.

The elastomers of this invention can be cured (vulcanized) into useful elastomers by conventional rubber compounding and vulcanization techniques. Thus, they may be compounded on standard rubber processing equipment with conventional ingredients, such as carbon black, or other fillers, vulcanizing agents such as accelerators and sulfur, promotors such as zinc oxide, lubricants and mold release agents, antioxidants, plasticizers and the like, and compression molded into useful elastomers.

The following examples are provided for illustrative purposes and may include particular features of the invention. However, the examples should not be construed as limiting the invention, many variations of which are possible without departing from the spirit or scope thereof.

Example 1

Preparation of Oligomeric Polyester

Dimethyl terephthalate (194 grams, 1.0 mole) and 140 grams, 1.56 moles of 1,4-butanediol (mole ratio of 1,4-butanediol to terephthalate 3.12/2) were heated under nitrogen in the presence of 30 drops of tetrabutyl titanate. The reaction mixture was stirred at a temperature of 160°–180° C until the theoretical amount of methanol was recovered. The resulting oligomer was a solid, m.p. 172°–174°.

EXAMPLE 2

Preparation of Vulcanizable Elastomer from Thiodiethanol And Oligomeric Polyester Following a procedure similar to Example 1, 30 grams (0.155 mole) of dimethyl terephthalate, 21.6 grams (0.240 mole) of 1,4-butanediol and 5 drops of tetrabutyl titanate were reacted to provide a substantially 3:2 oligomer, m.p. 170°–173° C.

To the reaction vessel containing the above oligomer was then added 300 grams of thiodiethanol, 10 grams of the monoallyl ether of trimethylolpropane, 1 gram of water, 0.5 gram of phosphorous acid and 0.25 gram of p-toluene sulfonic acid. The reaction mixture was heated under nitrogen for about 24 hours at 165° C, distilling water as formed (40 ml. collected). A vacuum was then applied and the reaction continued at 160°–170° C/4.5 mm. for about 40 hours to give an elastomeric gum (72% yield) having a Mooney viscosity of 23.5.

The elastomeric gum was then compounded on a conventinal rubber mill using the following recipe:

| Recipe | Parts by Weight |
| --- | --- |
| Elastomer of Example 2 | 25 |
| Carbon black | 15 |
| Titanium dioxide | 1 |
| Mercaptobenzothiazole | 0.375 |
| Tetramethylthiuram disulfide | 0.375 |
| Sulfur | 0.25 |
| Zinc oxide | 1.25 |
| Cyanuric acid | 0.25 |

The compound elastomer was compression molded for 15 minutes at 300° F and post-cured for 48 hours at 100° C. Stress-strain properties are shown in Table I:

Table 1

| Hardness, Shore A | 72 |
| --- | --- |
| Modulus, psi | |
| At 100% | 395 |
| at 300% | 1515 |
| Tensile, psi | 2250 |
| Elongation, % | 445 |

EXAMPLE 3

Following a procedure similar to Example 1, 48.5 grams (0.25 mole) of dimethyl terephthalate, 35.0 grams (0.39 mole) of 1,4-butanediol and 10 drops of tetrabutyl titanate were reacted to produce an oligomer, m.p. 170°–174° C.

To the reaction vessel containing the above oligomer was added 300 grams of thiodiethanol, 15 grams of monoallyl ether of trimethylolpropane, 1 gram of water, 0.5 gram phosphorous acid and 0.25 gram of p-toluenesulfonic acid. The reaction mixture was heated at 165° C for 18 hours under nitrogen, distilling water as formed (38 ml. collected).

Ninety grams of the residual reaction product was further heated at 165°–170° C/2–3 mm. Hg for about 48 hours using a high shear mixer. A gum was obtained which had a Mooney viscosity of 23.

Twenty-five grams of the above gum was compounded using the following recipe.

| Recipe | Parts by Weight |
| --- | --- |
| Elastomer | 25 |
| Carbon black | 15 |
| Titanium dioxide | 1 |
| Mercaptobenzothiazole | 0.4 |
| Tetramethylthiuram disulfide | 0.4 |
| Sulfur | 0.2 |
| Zinc oxide | 1.25 |
| Cyanuric acid | 0.75 |

The composition was then cured by compression molding for 15 minutes at 300° F, followed by post-curing for 48 hours at 100° C in an oven. The stress-strain properties shown in Table II were obtained:

Table II

| Hardness, Shore A | 82 |
| --- | --- |
| Modulus, psi | |
| at 100% | 635 |
| at 300% | 2500 |
| Tensile, psi | 2520 |
| Elongation, % | 300 |

Thermomechanical analysis gave a glass transition temperature (Tg) of −54° C. Volume change after 7 days at 150° C in ASTM # 3 oil was zero.

When samples of the cured elastomer were exposed for 4 days at 85° C/100% relative humidity before testing, the composition gave the properties shown in Table III.

Table III

| Hardness, Shore A | 75 |
| --- | --- |
| Modulus, psi | |
| at 100% | 385 |
| at 300% | 1435 |
| Tensile, psi* | 1875 |
| Elongation, % | 385 |

*75% retention after exposure to heat and humidity.

EXAMPLE 4

Preparation of Oligomeric Polyester

Dimethyl terephthalate (387.5 grams, 2.0 moles) and 227.5 grams, 2.5 moles of 1,4-butanediol (mole ratio 1,4-butanediol to dimethylterephthalate 5/4) were heated under nitrogen in the presence of 25 drops of tetrabutyl titanate. The reaction mixture was stirred at 155°–210° C until the theoretical amount of methanol was recovered. The resulting oligomer was a solid, m.p. 194°–197° C.

EXAMPLE 5

Thirty-five grams of the oligomer of Example 4, 300 grams of thiodiethanol, 17.5 grams of the monoallyl ether of trimethylolpropane, 1.25 grams of phosphorous acid and 1.0 ml. water were heated to 185° C for 2 hours, then for 1.5 hours at reduced pressure (20 inches) until 43 ml. of water was collected.

Ninety grams of the resulting syrup and 0.1 gram p-toluenesulfonic acid were heated for 16 hours at reduced pressure to give a tough elastomeric gum.

The gum was compounded on a rubber mill as follows:

| Recipe | Parts by Weight |
|---|---|
| Gum | 20.0 |
| Carbon black | 12.0 |
| Titanium dioxide | 0.4 |
| MAMC* | 1.25 |

*methylammonium methyldithiocarbamate

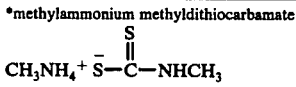

(see Woodhams, U.S. Pat. No. 3,474,077) and cured for 15 minutes at 300° F, followed by postcuring for 48 hours at 100° C. The cured elastomer exhibited the following properties (Table IV).

Table IV

| Hardness, Shore A | 72 |
|---|---|
| Modulus, psi | |
| at 100% | 300 |
| at 300% | 1105 |
| Tensile, psi | 2425 |
| Elongation, % | 595 |

We claim:

1. A vulcanizable elastomeric composition comprising the condensation product of (a) thiodiethanol, (b) one or more oligomeric diols represented by the structure:

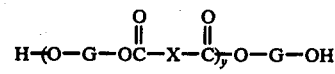

wherein G represents a divalent, open-chain alkylene group containing from 3 to 8 carbon atoms, X represents a divalent aromatic or cycloaliphatic hydrocarbon radical, and $y$ is a number from about 1.5 to 6, and (c) one or more aliphatic diols different from (a) or (b); said composition being characterized as comprising at least about 50 mole percent thiodiethanol, from about 0.5 to about 8 mole percent of said oligomeric diol, the remainder being said aliphatic diol or diols, and further provided that from about 1 to 10 mole percent thereof comprises an aliphatic diol containing an external allylic double bond represented by the group:

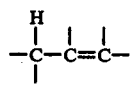

2. The composition of claim 1 wherein X is selected from the group consisting of m-phenylene, p-phenylene, m-hexahydrophenylene, and p-hexahydrophenylene.

3. The composition of claim 1 wherein said aliphatic diol containing an external allylic double bond is the monallyl ether of trimethylolpropane.

4. The composition of claim 1 wherein G is 1,4-butylene, X is p-phenylene and $y$ is about 2.

5. The composition of claim 4 wherein said aliphatic diol containing an external allylic double bond is the monoallyl ether of trimethylolpropane.

* * * * *